US012686231B2

(12) United States Patent
Gallagher et al.

(10) Patent No.: US 12,686,231 B2
(45) Date of Patent: Jul. 21, 2026

(54) POLYURETHANE GAUGE WHEEL TIRE

(71) Applicant: Gallagher Corporation, Gurnee, IL (US)

(72) Inventors: Richard Gallagher, Lake Bluff, IL (US); Shaun Gosselin, Fox Lake, IL (US)

(73) Assignee: Gallagher Corporation, Gurnee, IL (US)

( * ) Notice: Subject to any disclaimer, the term of this patent is extended or adjusted under 35 U.S.C. 154(b) by 70 days.

(21) Appl. No.: 18/973,843

(22) Filed: Dec. 9, 2024

(65) Prior Publication Data

US 2025/0100329 A1 Mar. 27, 2025

Related U.S. Application Data

(60) Continuation of application No. 18/602,669, filed on Mar. 12, 2024, now Pat. No. 12,240,277, which is a (Continued)

(51) Int. Cl.
*B60C 7/10* (2006.01)
*B29C 65/00* (2006.01)
(Continued)

(52) U.S. Cl.
CPC ............ *B60C 7/1015* (2021.08); *B29C 65/02* (2013.01); *B29C 65/06* (2013.01); *B29C 66/547* (2013.01); *B29C 66/73921* (2013.01); *B29D 30/02* (2013.01); *B60C 7/102* (2013.01); *B60C 7/12* (2013.01); *B29C 66/54* (2013.01); *B29K 2075/00* (2013.01); *B60C 2001/0091* (2013.01);
(Continued)

(58) Field of Classification Search
None
See application file for complete search history.

(56) References Cited

U.S. PATENT DOCUMENTS

| | | |
|---|---|---|
| 2,978,277 A | 4/1961 | Gaudry |
| 3,450,182 A | 6/1969 | Henri |
| | (Continued) | |

FOREIGN PATENT DOCUMENTS

| | | |
|---|---|---|
| EP | 0076412 A2 | 4/1983 |
| EP | 1238824 A1 | 9/2002 |
| WO | 2012171055 A1 | 12/2012 |

*Primary Examiner* — Jacob T Minskey
*Assistant Examiner* — Adrien J Bernard
(74) *Attorney, Agent, or Firm* — Pierce Atwood LLP

(57) ABSTRACT

A disclosed example embodiment of a gauge wheel tire includes a first polyurethane sidewall portion, a second polyurethane sidewall portion, a polyurethane ground-engaging portion, and a polyurethane axial support portion. The first polyurethane sidewall portion is spaced apart from the second polyurethane sidewall portion, and the polyurethane ground-engaging portion extends from the first polyurethane sidewall portion to the second polyurethane sidewall portion and is adapted to contact a ground surface as the gauge wheel tire rotates about an axis of rotation. The polyurethane axial support portion extends from the first polyurethane sidewall portion to the second polyurethane sidewall portion, and is spaced apart from the polyurethane ground-engaging portion to form a gap that allows radial movement of the polyurethane ground-engaging portion relative to the polyurethane axial support portion.

23 Claims, 10 Drawing Sheets

Related U.S. Application Data division of application No. 16/787,337, filed on Feb. 11, 2020, now Pat. No. 11,970,031.

(60) Provisional application No. 62/805,245, filed on Feb. 13, 2019.

(51) Int. Cl.

| | |
|---|---|
| *B29C 65/02* | (2006.01) |
| *B29C 65/06* | (2006.01) |
| *B29D 30/02* | (2006.01) |
| *B60C 7/12* | (2006.01) |
| *B29K 75/00* | (2006.01) |
| *B60C 1/00* | (2006.01) |
| *B60C 7/00* | (2006.01) |
| *B60C 11/00* | (2006.01) |
| *B60C 13/00* | (2006.01) |

(52) U.S. Cl.
CPC ........ *B60C 2007/005* (2013.01); *B60C 7/101* (2021.08); *B60C 7/121* (2021.08); *B60C 2011/0016* (2013.01); *B60C 2013/006* (2013.01); *B60C 2200/08* (2013.01); *Y10T 152/10306* (2015.01)

(56) References Cited

U.S. PATENT DOCUMENTS

| | | | |
|---|---|---|---|
| 3,470,433 | A | 9/1969 | Roland |
| 3,977,453 | A | 8/1976 | Coran et al. |
| 4,049,767 | A | 9/1977 | Vaidya |
| 4,430,952 | A | 2/1984 | Murray |
| 4,449,756 | A | 5/1984 | Weeks |
| 4,493,274 | A | 1/1985 | Robinson, Jr. et al. |
| 4,733,730 | A | 3/1988 | Murray |
| 4,802,519 | A | 2/1989 | Moranz |
| 4,998,980 | A | 3/1991 | Katou |
| 5,167,439 | A | 12/1992 | Green et al. |
| 5,343,916 | A | 9/1994 | Duddey et al. |
| 5,460,213 | A | 10/1995 | Pajtas |
| 5,533,793 | A | 7/1996 | Walker |
| 5,887,664 | A | 3/1999 | Whalen et al. |
| 6,102,091 | A | 8/2000 | Peterson et al. |
| 6,227,622 | B1 | 5/2001 | Roderick et al. |
| 6,463,972 | B1 | 10/2002 | Lacour |
| 6,644,223 | B2 | 11/2003 | Prairie et al. |
| 6,820,669 | B2 | 11/2004 | Hodges et al. |
| 6,845,796 | B2 | 1/2005 | Katoh et al. |
| 7,032,634 | B2 | 4/2006 | Laurent et al. |
| 7,128,110 | B2 | 10/2006 | Yamazaki et al. |
| 7,481,278 | B1 | 1/2009 | Pomedli et al. |
| 7,481,498 | B1 | 1/2009 | Morris |
| 8,037,911 | B2 | 10/2011 | Morris |
| 8,544,516 | B2 | 10/2013 | Mariman et al. |
| 8,851,131 | B2 | 10/2014 | Luchini et al. |
| 9,139,045 | B2 | 9/2015 | Palinkas et al. |
| 9,643,454 | B2 | 5/2017 | Kumar et al. |
| 10,136,572 | B2 | 11/2018 | Weisz et al. |
| 10,538,130 | B2 | 1/2020 | Kim et al. |
| 10,660,260 | B2 | 5/2020 | Phely et al. |
| 11,225,108 | B2 | 1/2022 | Nakajima |
| 11,958,322 | B2 | 4/2024 | Nesbitt |
| 12,240,277 | B2 | 3/2025 | Gallagher et al. |
| 2003/0024622 | A1 | 2/2003 | Chrobak et al. |
| 2004/0089209 | A1 | 5/2004 | Joaquin Romagnoli |
| 2005/0218712 | A1 | 10/2005 | Beaumier |
| 2010/0251947 | A1 | 10/2010 | Mariman et al. |
| 2013/0206313 | A1 | 8/2013 | Conti |
| 2014/0319899 | A1 | 10/2014 | Colon |
| 2015/0122386 | A1 | 5/2015 | Kumar et al. |
| 2015/0273945 | A1 | 10/2015 | Fudemoto et al. |
| 2016/0114623 | A1 | 4/2016 | Smith et al. |
| 2016/0128266 | A1 | 5/2016 | Phely et al. |
| 2018/0134084 | A1 | 5/2018 | Seljan et al. |
| 2018/0290494 | A1 | 10/2018 | Kon et al. |
| 2019/0016176 | A1 | 1/2019 | Johnson |
| 2020/0016933 | A1 | 1/2020 | Knotowicz et al. |
| 2020/0137945 | A1 | 5/2020 | Bot et al. |
| 2023/0397523 | A1 | 12/2023 | Garner et al. |
| 2024/0217271 | A1 | 7/2024 | Gallagher et al. |

100

POLYURETHANE GAUGE WHEEL TIRE

CROSS-REFERENCE TO RELATED APPLICATIONS

This application is a continuation of and claims the benefit under 35 U.S.C. § 120 of U.S. patent application Ser. No. 18/602,669, entitled POLYURETHANE GAUGE WHEEL TIRE, filed Mar. 12, 2024, which is a divisional and claims the benefit under 35 U.S.C. § 120 and 35 U.S.C. § 121 of U.S. patent application Ser. No. 16/787,337, entitled POLY-URETHANE GUAGE WHEEL TIRE, filed Feb. 11, 2020, which claims the benefit under 35 U.S.C. § 119 (e) of U.S. Provisional Application Ser. No. 62/805,245 entitled HOL-LOW POLYURETHANE GAUGE WHEEL, filed Feb. 13, 2019, the entire contents of each of which are incorporated herein by reference for all purposes.

BACKGROUND

Modern day agricultural planters are sophisticated machines. Planters place seeds into the soil at a precise depth and frequency, in many rows simultaneously as the machinery progresses down the field. A pivotal component of the planter is the gauge wheel. Gauge wheels essentially consist of a rim, which could be one or multiple pieces and a tire which contacts the ground and possibly a disc, used for opening a slot to place seeds in the soil. Each row of the planter has one or multiple gauge wheels. These wheels regulate the depth at which seeds are placed into the ground. The gauge wheels ride on top of the field surface and are subjected to harsh conditions due to debris and rocks left in the field from previous planting seasons, especially if the grower utilizes a "no-till" philosophy.

SUMMARY

In some embodiments, a gauge wheel tire comprises a first polyurethane sidewall portion, a second polyurethane sidewall portion, a polyurethane ground-engaging portion, and a polyurethane axial support portion. The first polyurethane sidewall portion is spaced apart from the second polyurethane sidewall portion, and the polyurethane ground-engaging portion extends from the first polyurethane sidewall portion to the second polyurethane sidewall portion and is adapted to contact a ground surface as the gauge wheel tire rotates about an axis of rotation. The polyurethane axial support portion extends from the first polyurethane sidewall portion to the second polyurethane sidewall portion, and is spaced apart from the polyurethane ground-engaging portion to form a gap that allows radial movement of the polyurethane ground-engaging portion relative to the polyurethane axial support portion.

In some embodiments, a method for making a gauge wheel tire involves forming a first elastomer component comprising at least a ground-engaging portion of the gauge wheel tire, the ground-engaging portion being adapted to contact a ground surface as the gauge wheel tire rotates about an axis of rotation. The method further involves forming a second elastomer component comprising at least an axial support portion, and combining the first elastomer component and the second elastomer component into an assembly in which the axial support portion is spaced apart from the ground-engaging portion to form a gap that allows radial movement of the ground-engaging portion relative to the axial support portion.

DETAILED DESCRIPTION

Figure 1:
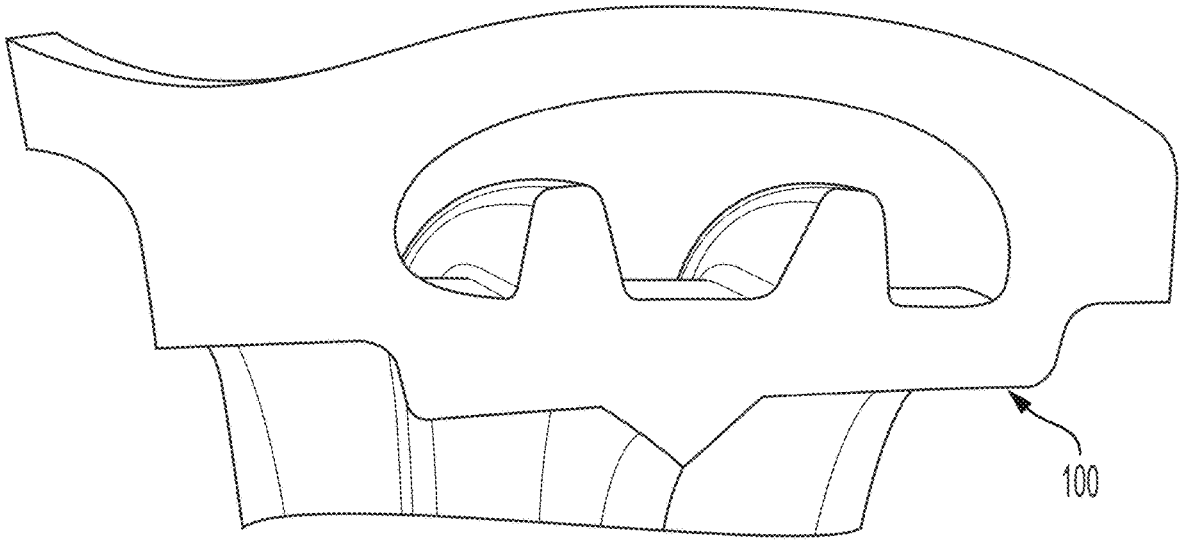
FIG. 1 shows a cutaway drawing of a conventional rubber gauge wheel tire.

Conventional gauge wheel tires are made of a low modulus material, such as rubber, that is both flexible and resilient. A cutaway drawing of such a conventional rubber gauge wheel tire 100 is shown in FIG. 1. Some prior attempts to make gauge wheel tires with higher modulus materials have been inadequate because, due their solid construction or other features, they cannot deflect appreciably. That is, the tires have been unable to flex like a traditional rubber gauge wheel tire. Flexing can be important because the flexing causes mud build-up to be ejected from the wheel, e.g., in wet field conditions. Furthermore, a flexible and compliant gauge wheel tire can reduce soil compaction. This can be important because soil compaction can lead to less than ideal growing conditions for a newly planted seed.

U.S. Pat. No. 9,643,454 ("the '454 patent") describes a gauge wheel constructed with a tire made of a higher modulus material and a "hollow channel" that allows some radial flexing of the tire. While the hollow channel the '454 patent describes can provide some benefits, the inventors have recognized and appreciated a significant flaw with that design. In particular, the gauge wheel tire the '454 patent describes is unable to maintain its rigidity in the axial direction. Such lack of rigidity in the axial direction allows gaps to form between the tire and the rim(s), and thus allows field debris to enter the internal hollow channel of the gauge wheel.

Offered is a gauge wheel tire made of a higher modulus material that, in addition to being able to flex appreciably in the radial direction, is able to maintain its rigidity in the axial direction. Example embodiments of gauge wheel tires 202a, 202b having such characteristics are described below in connection with FIGS. 3-10. Before describing those embodiments, however, a brief description of an illustrative planting apparatus on which such tires may be employed will be provided.

Figure 2:
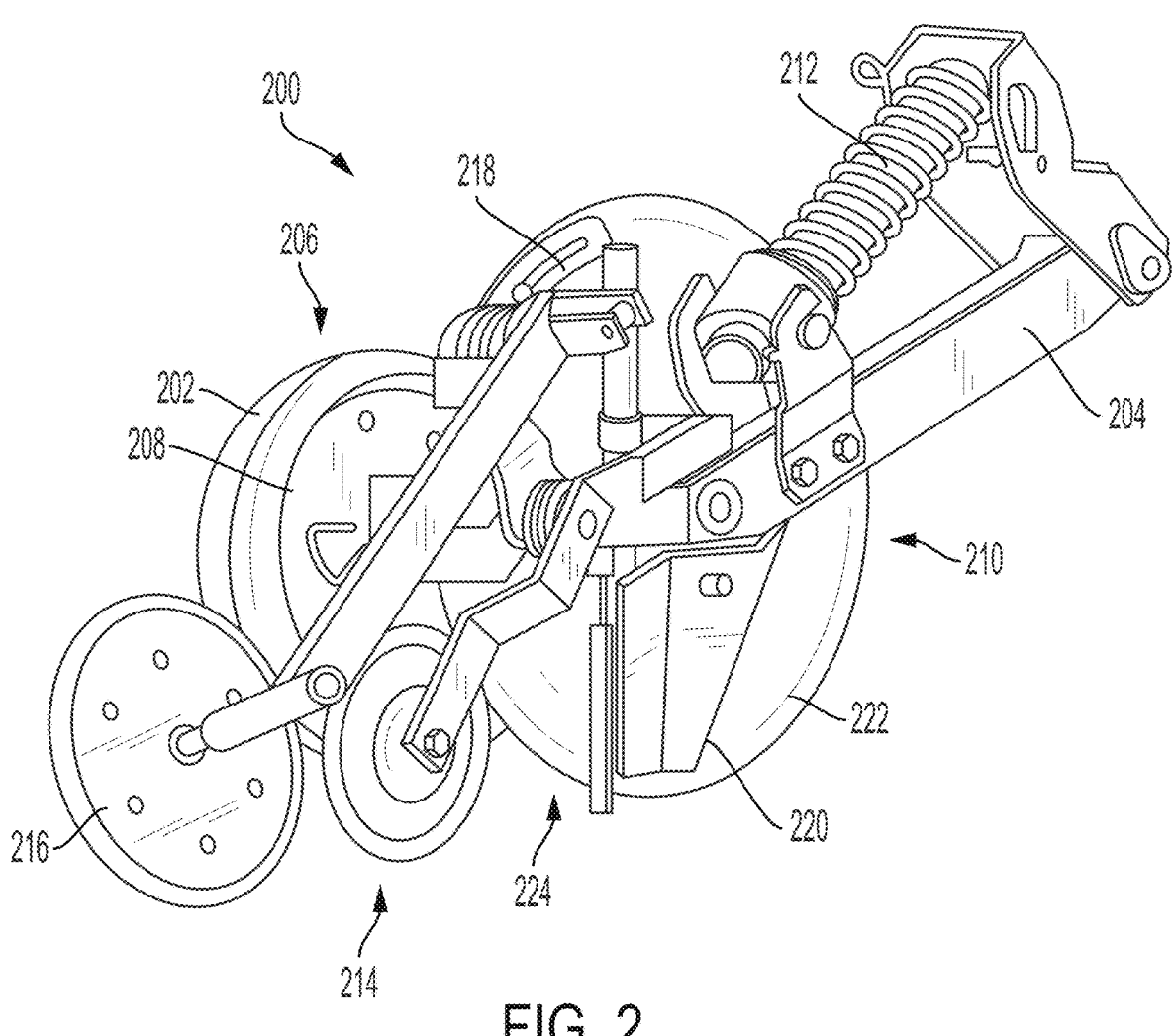
FIG. 2 is a perspective view of an example agricultural planter on which a gauge wheel tire configured in accordance with the present disclosure may be deployed.
Figure 3C:
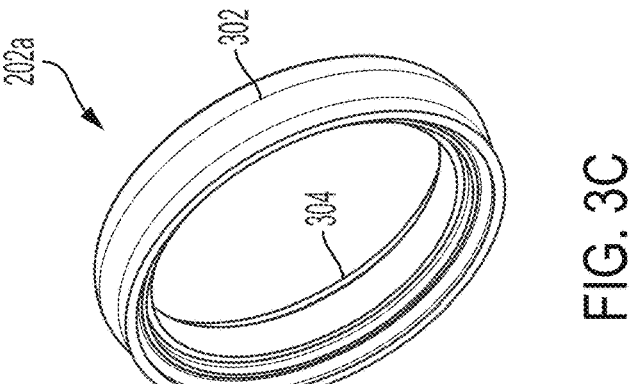
FIG. 3C is a perspective view of the first example gauge wheel tire shown in FIG. 3A.
Figure 3B:
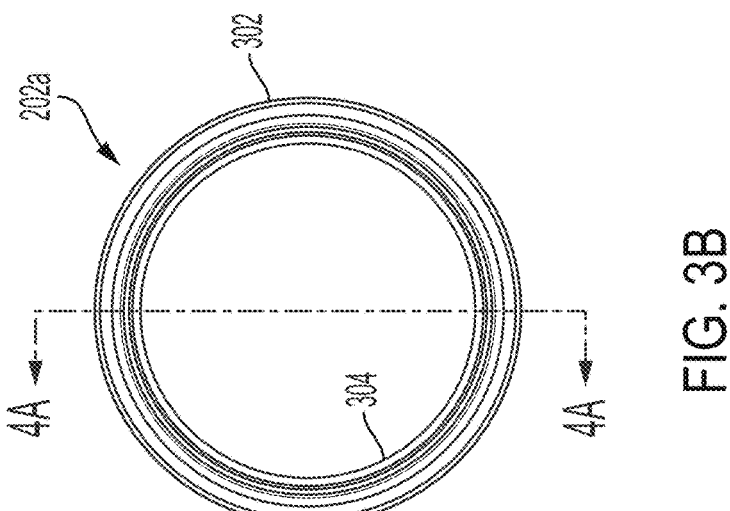
FIG. 3B is an elevation view of the first example gauge wheel tire shown in FIG. 3A.
Figure 3A:
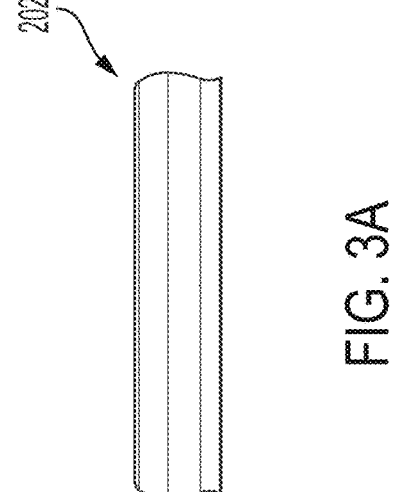
FIG. 3A is a plan view of the top of a first example gauge wheel tire configured in accordance with the present disclosure.

FIG. 2 illustrates a perspective view of a portion of an agricultural planter 200 with which a gauge wheel tire 202 configured in accordance with the present disclosure may be employed. As shown, the agricultural planter 200 may include an arm 204 that supports a gauge wheel 206. As described in more detail below, the gauge wheel 206 may be formed by mounting a gauge wheel tire 202 on one or more rims 208. A disc or knife 210 may be coupled to the planter arm 204. The disc or knife 210 may engage and open soil, creating a furrow for the receipt of seeds, seedlings, or other plants to be planted by the planter 200. The arm 204 may also support a pressure adjustment member 212 for adjusting the downward pressure that is applied to the disc or knife 210 engaging the soil to facilitate consistent seed placement.

A seed firming wheel 214 may be coupled to arm 204. The seed firming wheel 214 may gently pack a seed, seedling, or other plant to be planted at the bottom of the furrow. A packer wheel 216 may be coupled to arm 204 in order to close the furrow after seed placement. A depth control assembly 218 may be coupled to the arm 204 to enable the making of depth adjustments to the seeding depth.

A scraper 220 may be provided on a first side 222 of the disc or knife 210. The scraper 220 may be coupled to the arm 204 to protect against plugging, while additionally acting as a seed boot, thus creating a shelf for accurate seed placement in the furrow. As illustrated, the gauge wheel 106 may be provided on a second side 224 of the disc. The rim(s) 208 may carry the gauge wheel tire 202 which engages or rolls over the soil or ground. In addition, the gauge wheel tire 202 may contact the second side 224 of the disc or knife 210, creating a cleaning action to facilitate removal of debris deposited on the disc during planting operations.

A first example of a gauge wheel tire 202a capable of overcoming the above-noted problems is shown in FIGS. 3A-C, 4A-B, 5A-D and 6A-D. A second example of a gauge wheel tire 202b capable of overcoming the above-noted problems is shown in FIGS. 7A-C, 8A-B, 9A-D and 10A-D. Because the two embodiments are similar in many respects, they will be described together, with differences between the embodiments being pointed out when appropriate.

In some embodiments, the gauge wheel tires 202a and 202b may comprise multiple, individually constructed pieces combined into a final assembly. In other embodiments, the gauge wheel tires 202a and 202b may be molded as a single, integral unit. In the illustrated examples, the gauge wheel tires 202a and 202b (illustrated in their assembled states in FIGS. 3A-C and 4A-B and 7A-C and 8A-B, respectively) each comprise multiple individually manufactured sections including an outer component 302, 702 (illustrated separately in FIGS. 5A-D and 9A-D) and one or more inner components 304, 704 (illustrated separately in FIGS. 6A-D and 10A-D). Although, in the examples shown, the inner component 304, 704 is a single component that extends continuously about a circular inner circumference 502, 902 of the outer component 302, 702 (see FIGS. 5B and 9B) so as to form an annular cavity between the two components, it should be appreciated that, in other embodiments, multiple separate inner components 304, 704 may be distributed about the inner circumference 502, 902, either adjacent to or spaced apart from one another. It is important only that the one or more inner components provide at least some amount of rigidity in the axial direction between a first sidewall 402, 802 and a second sidewall 404, 804 (see FIGS. 4B & 5D and 8B & 9D) of the outer component 302, 702, while at the same time allowing at least some degree of flexibility of a ground engaging portion 410, 810 of the tire 202a, 202b in the radial direction, e.g., due to the presence of a hollow cavity 412, 812 between the outer component 302, 702 and the one or more inner components 304, 704. It should also be appreciated that, in some embodiments, the inner component(s) 304, 704, whether formed of a single piece or multiple pieces, may have one or more regions of reduced thickness and/or one or more regions including openings at locations at which structural integrity is not essential, thus minimizing the amount of material that is used for manufacture.

In embodiments that employ individually manufactured sections 302, 702, 304, 704, such sections may be constructed using materials with the same or different moduli and/or the same or different chemical make-up. It is important only that the individual pieces be constructed in such a way that is conducive to the final assembly process. In some embodiments, the final assembly of the gauge wheel tire 202a, 202b may resemble the profile and outer envelope of traditional, rubber gauge wheel designs, such as that shown in FIG. 1.

Figure 4B:
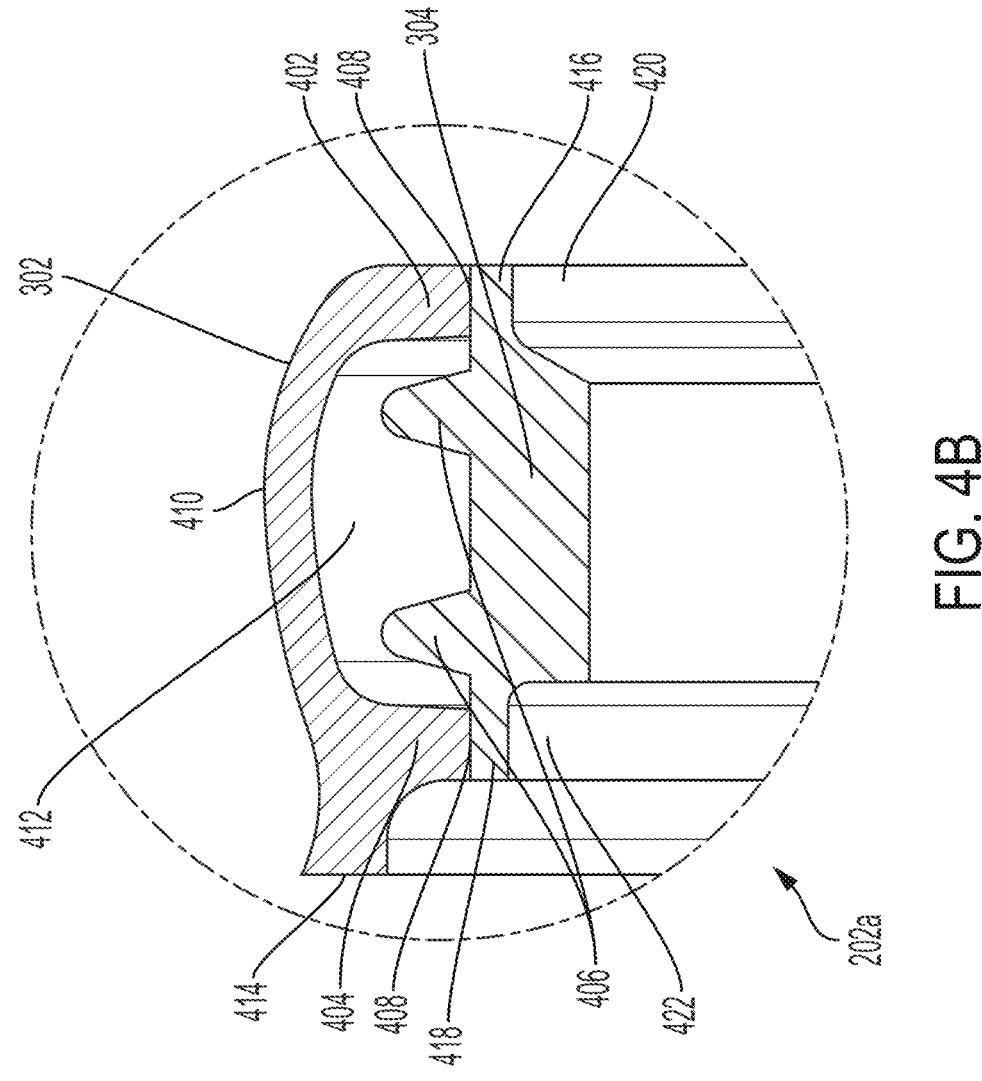
FIG. 4B is a magnified view of the circled region shown in FIG. 4A.
Figure 4A:
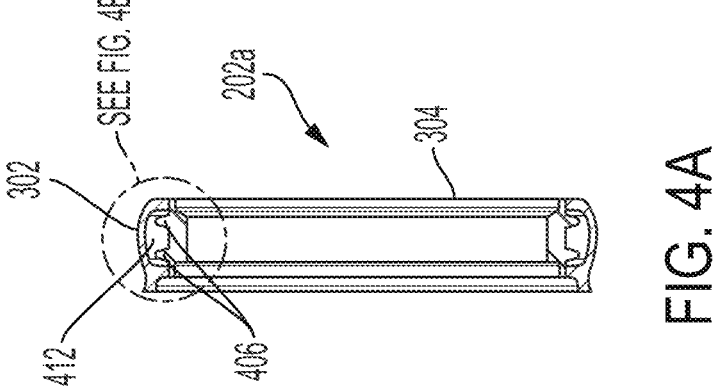
FIG. 4A is a cross-sectional view taken along the plane 4A-4A shown in FIG. 3B.
Figures 5A, 5B, 5C, 5D:
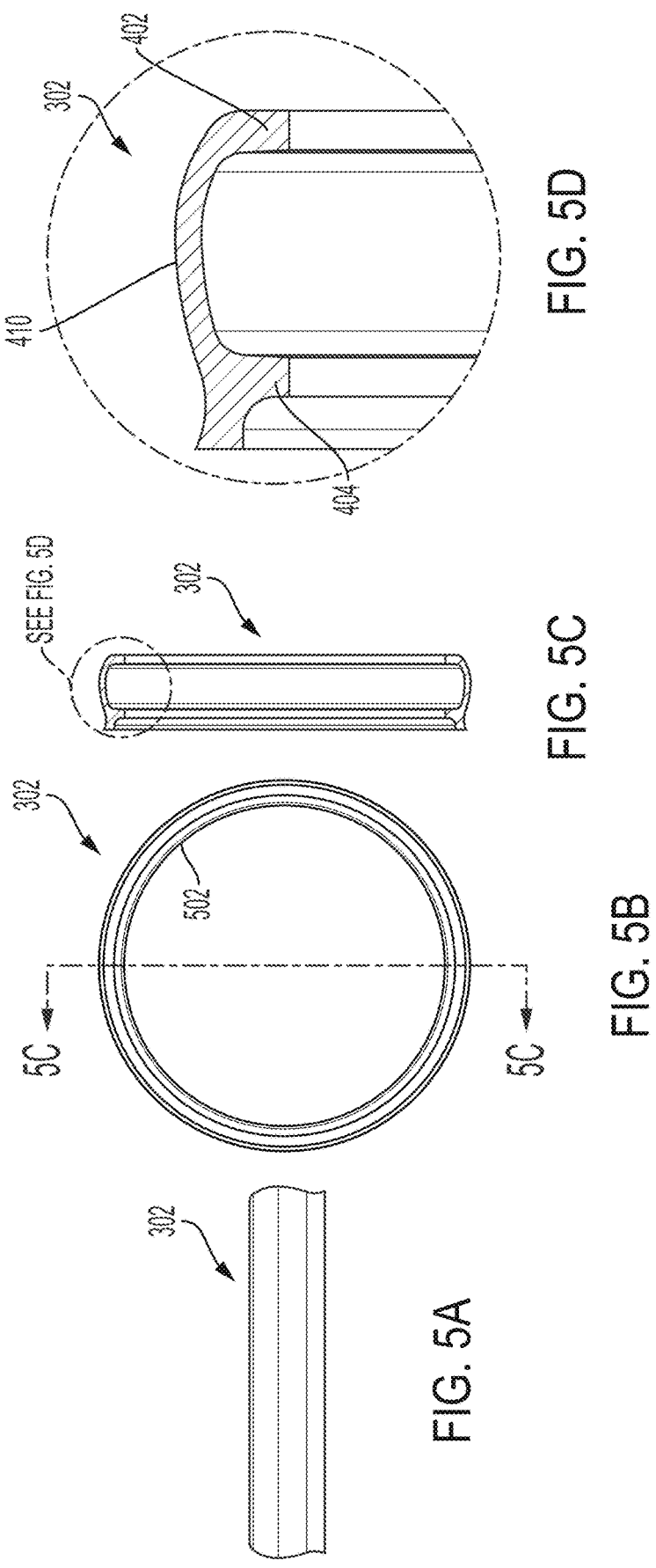
FIG. 5A is a plan view of the top of an outer component of the first example gauge wheel tire shown in FIGS. 3A-C and 4A-B.
FIG. 5B is an elevation view of the outer component shown in FIG. 5A.
FIG. 5C is a cross-sectional view taken along the plane 5C-5C shown in FIG. 5B.
FIG. 5D is a magnified view of the circled region shown in FIG. 5C.
Figures 6A, 6B, 6C, 6D:
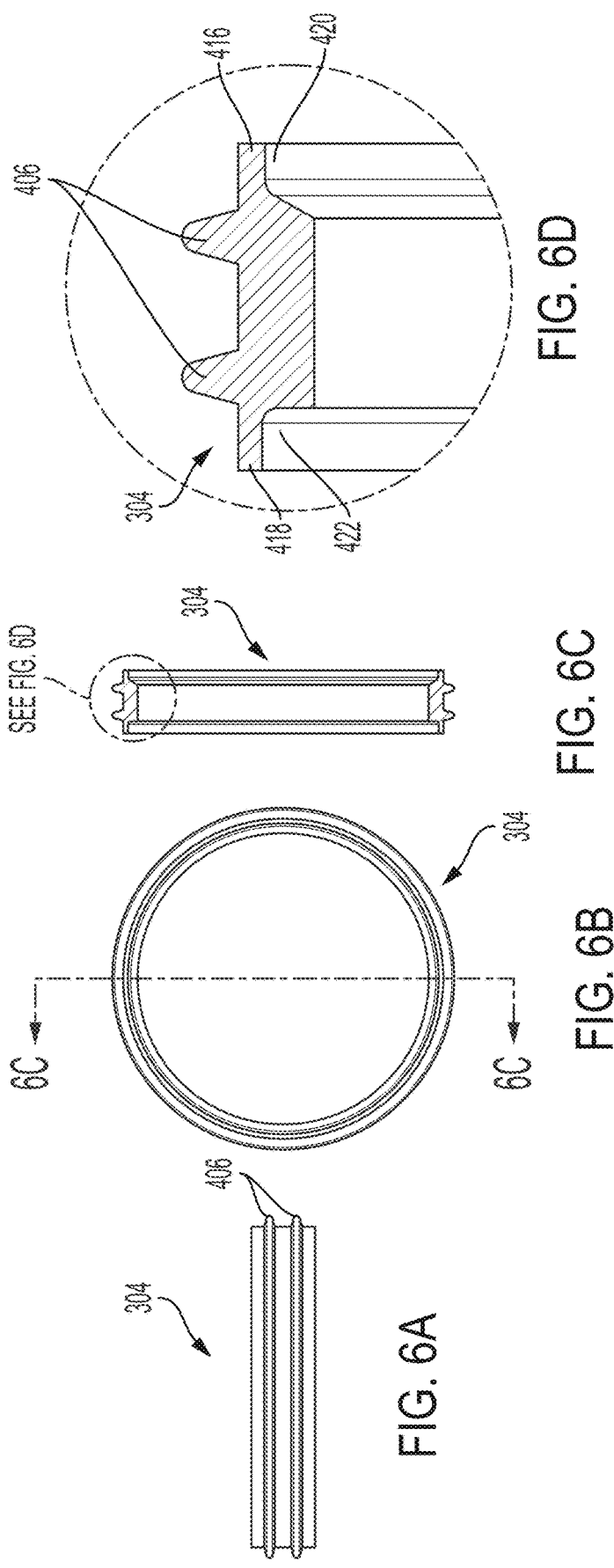
FIG. 6A is a plan view of the top of an inner component of the first example gauge wheel tire shown in FIGS. 3A-C and 4A-B.
FIG. 6B is an elevation view of the inner component shown in FIG. 6A.
FIG. 6C is a cross-sectional view taken along the plane 6C-6C shown in FIG. 6B.
FIG. 6D is a magnified view of the circled region shown in FIG. 6C.
Figure 7C:
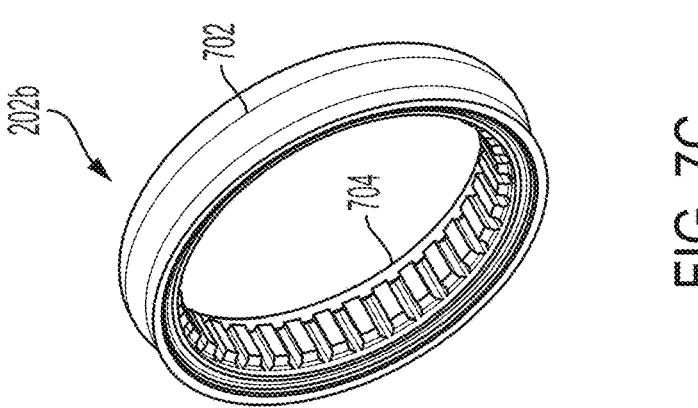
FIG. 7C is a perspective view of the second example gauge wheel tire shown in FIG. 7A.
Figure 7B:
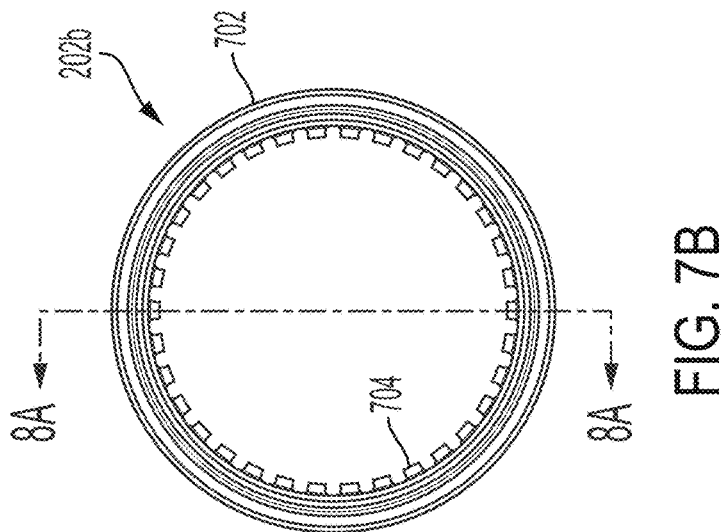
FIG. 7B is an elevation view of the second example gauge wheel tire shown in FIG. 7A.
Figure 7A:
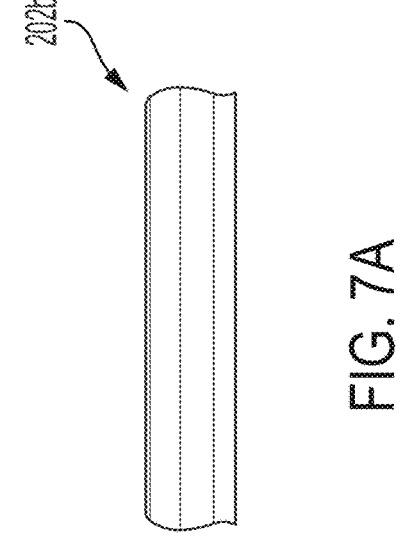
FIG. 7A is a plan view of the top of a second example gauge wheel tire configured in accordance with the present disclosure.
Figure 8B:
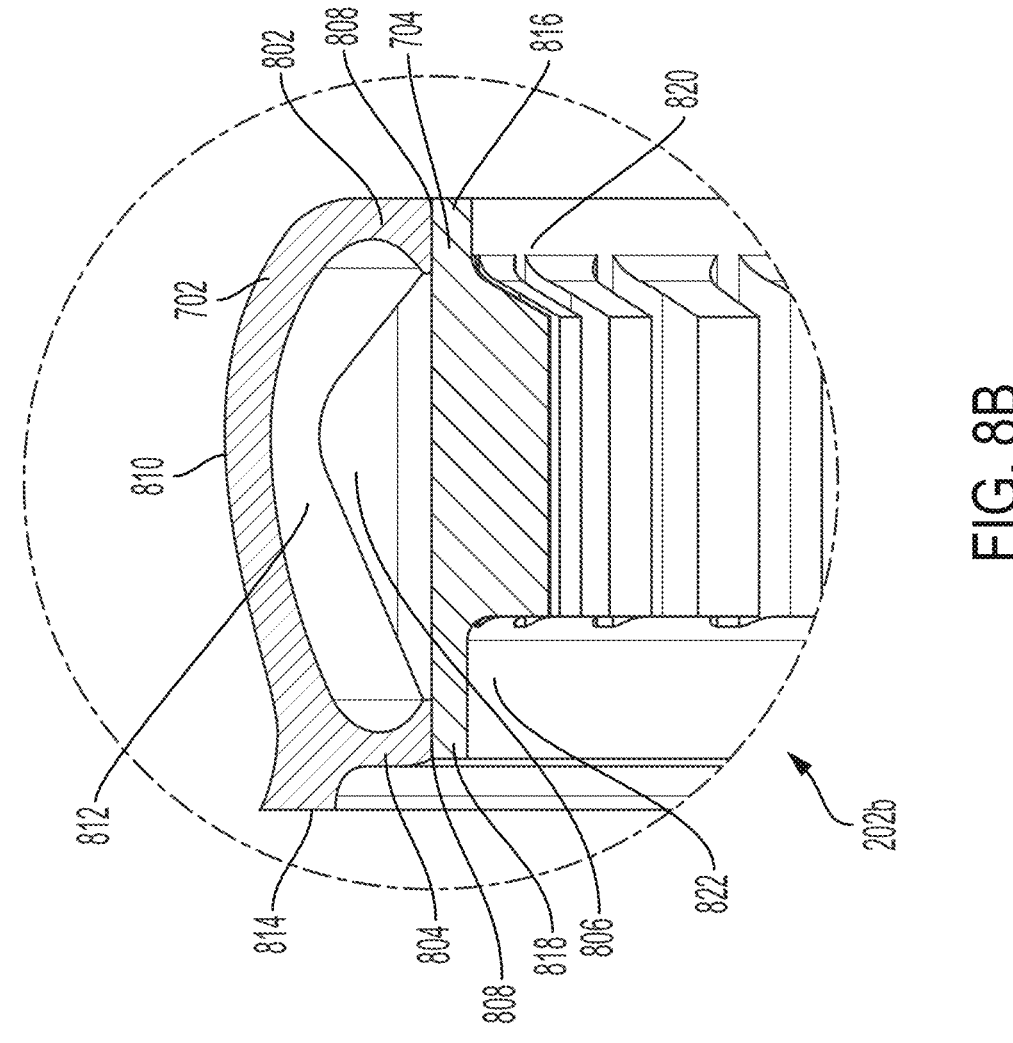
FIG. 8B is a magnified view of the circled region shown in FIG. 8A.
Figure 8A:
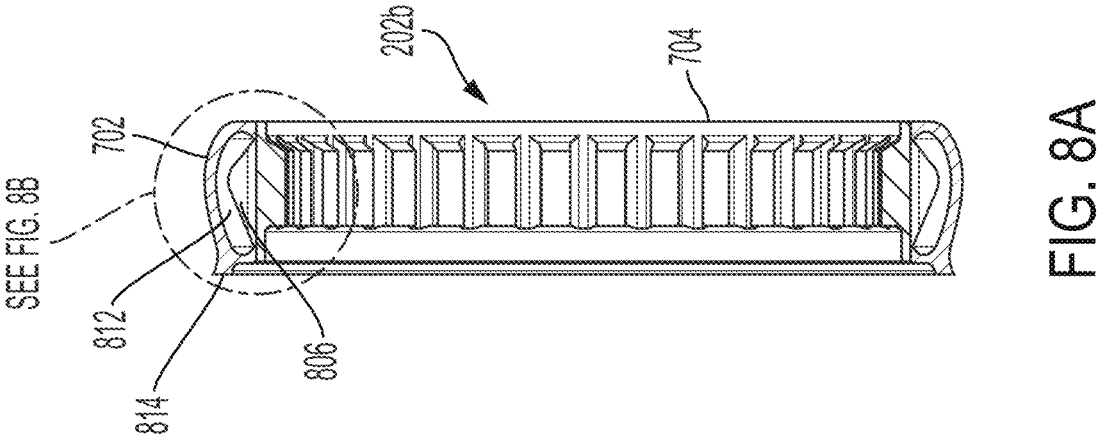
FIG. 8A is a cross-sectional view taken along the plane 8A-8A shown in FIG. 7B.
Figures 9A, 9B, 9C, 9D:
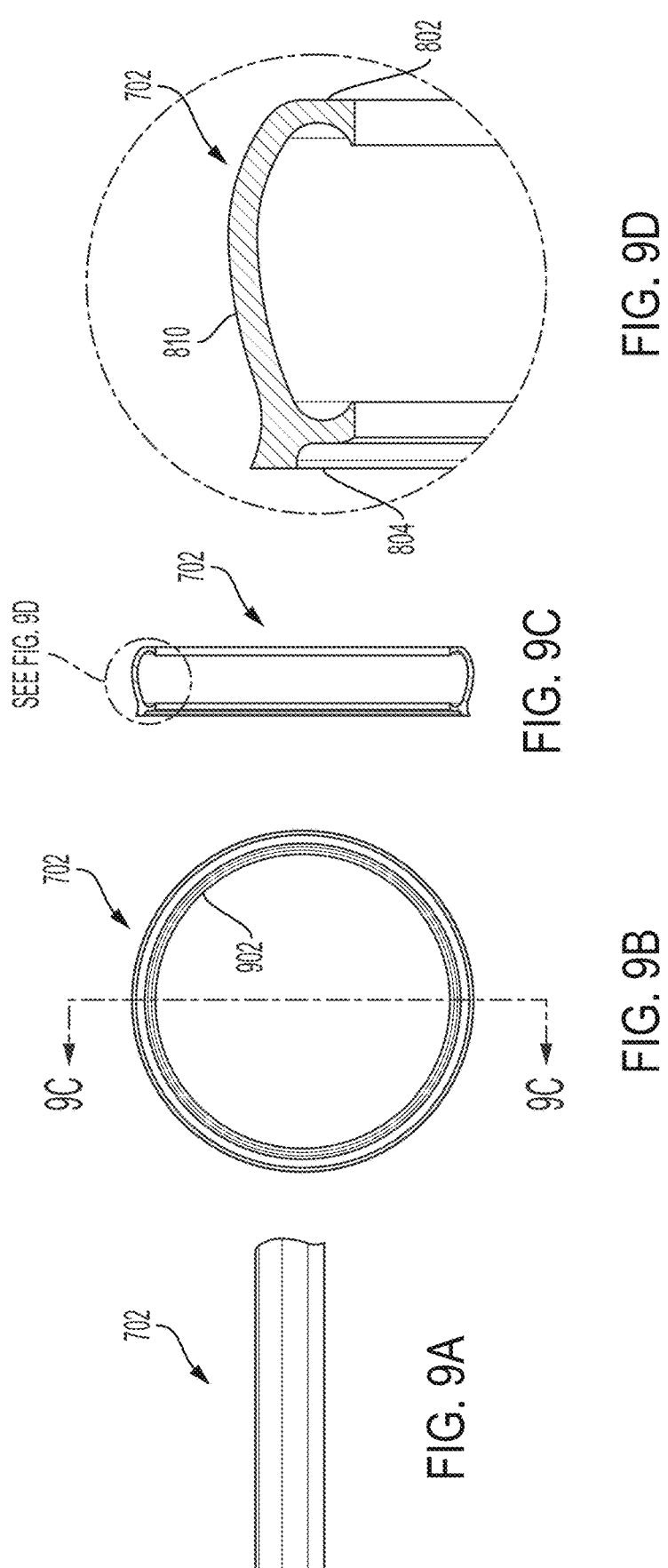
FIG. 9A is a plan view of the top of an outer component of the second example gauge wheel tire shown in FIGS. 7A-C and 8A-B.
FIG. 9B is an elevation view of the outer component shown in FIG. 9A.
FIG. 9C is a cross-sectional view taken along the plane 9C-9C shown in FIG. 9B.
FIG. 9D is a magnified view of the circled region shown in FIG. 9C.
Figures 10A, 10B, 10C, 10D:
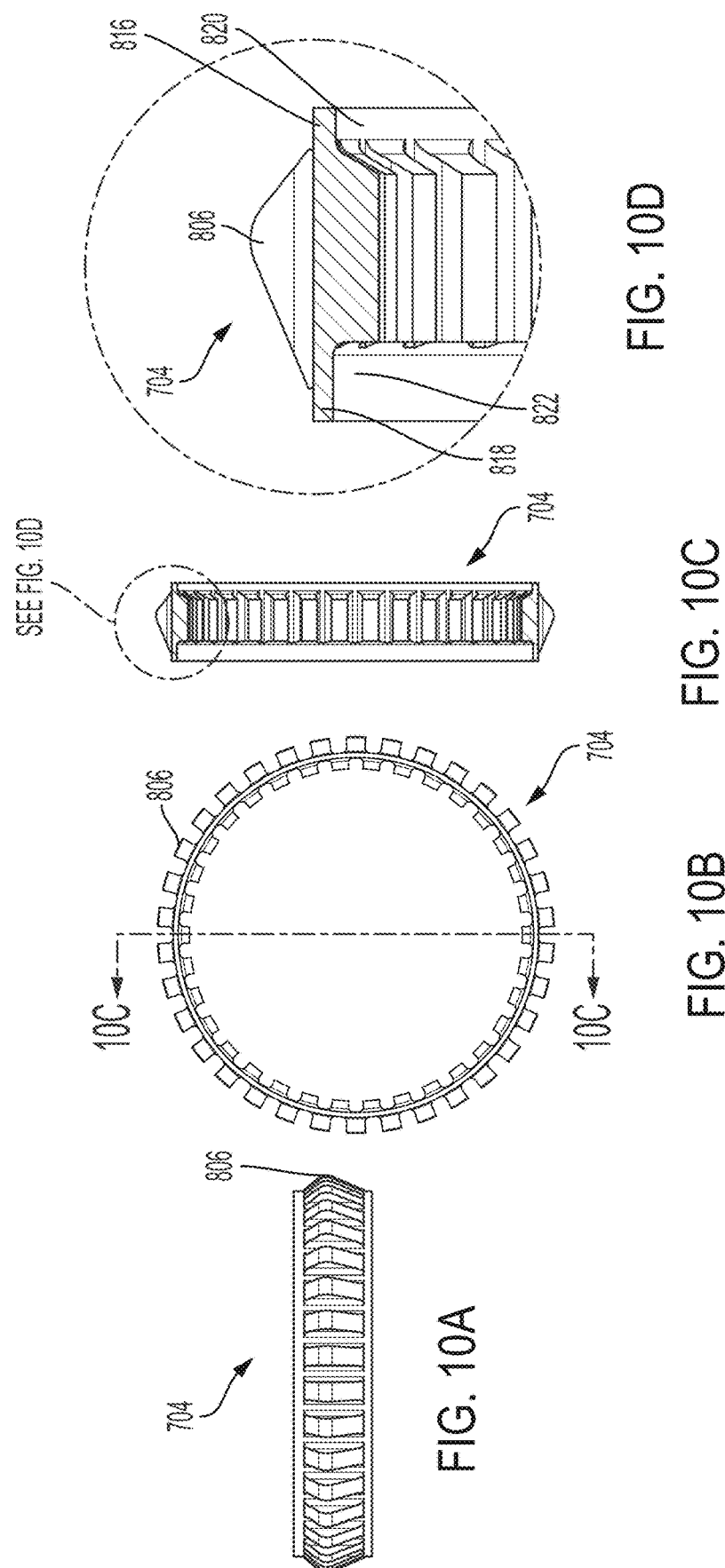
FIG. 10A is a plan view of the top of an inner component of the second example gauge wheel tire shown in FIGS. 7A-C and 8A-B.
FIG. 10B is an elevation view of the inner component shown in FIG. 10A.
FIG. 10C is a cross-sectional view taken along the plane 10C-10C shown in FIG. 10B.
FIG. 10D is a magnified view of the circled region shown in FIG. 10C.

As shown best in FIGS. 4A-B and 8A-B, in some embodiments, the manufacturing method may allow for a hollow cavity 412, 812 having a periphery (in at least some cross-sectional locations, such as those illustrated in FIGS. 4B and 8B) that is circumscribed completely by a higher modulus material (e.g., polyurethane). As noted above, such a configuration may allow the gauge wheel tire 202a, 202b to flex in the radial direction, while maintaining its rigidity in the axial direction. As illustrated, the inner component(s) 304, 704 may also be manufactured so as to include features 406, 806 which may inhibit over-flexing of the wheel in the radial direction in particularly rough terrain, thus preventing such over-flexing from causing seeds to be planted at inconsistent depths. As illustrated in FIGS. 6A-D, showing the inner component 304 of the example gauge wheel tire 202a, the features 406 may include a pair of protrusions that extend about an outer periphery of the inner component 304. As illustrated in FIGS. 10A-D, showing the inner component 704 of the example gauge wheel tire 202b, the features 806 may include a series of singular protrusions distributed periodically about the outer periphery of the inner component 704. Distributing the features 806 periodically, rather than continuously, about the outer periphery may minimize the amount of material used to form the inner component 704. As shown best in FIG. 10B, in some embodiments, material may also be omitted periodically about an inner periphery of the inner component 704 (e.g., at locations offset from the locations of the periodically distributed features 806 about the outer periphery) so as to further minimize the amount of material used to manufacture the gauge wheel tire 202b, while still providing an adequate surface area on the sides of the inner component 704 for engagement by the rim(s) 208 of the gauge wheel 206.

As shown best in FIGS. 4A, 4B, 8A and 8B, in some embodiments, the gauge wheel tire 202a, 202b may include a protrusion 414, 814 on at least one side that forms a generally flat region for contacting and cleaning debris from the disc or knife 210 of an agricultural planter 200, as described above.

As shown best in FIGS. 4B, 6D, 8B and 10D, in some embodiments, the inner component 304, 704 may include flanges 416, 418, 816, 818, that form annular cavities 420, 422, 820, 822 that are shaped to engage corresponding portions of one or more circular gauge wheel tire rims 208 (shown in FIG. 2). In other embodiments, one or both of the sidewall portions 402, 404, 802, 804 may additionally or alternatively include flanges or other structures to facilitate engagement with the gauge wheel tire rim(s) 208.

In some embodiments, the outer component 302, 702 and/or inner component(s) 304, 704 may be formed using elastomeric materials with a hardness of approximately 92 Shore A. Such a material has been found to provide a satisfactory balance between puncture resistance from field debris and overall flexibility of the assembly. Elastomeric materials softer than 92 Shore A, such as 90 Shore A, 85 Shore A, 80 Shore A, 75 Shore A or 70 Shore A, and/or elastomeric materials harder than 92 Shore A, such as 95 Shore A, 50 Shore D, 55 Shore D, 60 Shore D or 65 Shore D may additionally or alternatively be used for either or both of the outer component 302, 702 and the inner component(s) 304, 704.

The individual pieces of the final gauge wheel tire assembly 202a, 202b may be constructed using any of a number of elastomers. Examples of suitable materials include hot castable, room temperature castable or thermoplastic injection moldable polyurethanes, such as MDI polyurethane, TDI polyurethane, or PPDI polyurethane. An MDI polyurethane may include methylene diphenyl diisocyanate reacted with a polyester or polyether polyol. In some implementations, 1,4 butanediol may be employed as a chain extender to cure an MDI based polyurethane. In other implementations, other diols may additionally or alternatively be used as a chain extender. A TDI polyurethane may include toluene diisocyanate reacted with a polyester or polyether polyol. In some implementations, 4,4' methylenebis (2-chloroaniline) may be employed as a chain extender to cure a TDI based polyurethane. In other implementations, other diamines, such as Dimethylthiotoluenediamine or Methylene bis (2,6-diethyl-3-chloroaniline), may additionally or alternatively be used as a chain extender. A PPDI polyurethane may include p-phenylenediisocyanate reacted with a polyester or polyether polyol. In some implementations, 1,4 butanediol may be employed as a chain extender to cure an PPDI based polyurethane. In other implementations, other diols may additionally or alternatively be used as a chain extender. For MDI-based, TDI-based, or PPDI based polyurethanes, additives may also be added to the polyurethane compound in order to tailor select polyurethane material properties. For example, additives such as internal lubricants may be added to increase sliding abrasion resistance.

Other elastomeric material families may additionally or alternatively be used to construct one or more of the individual pieces of the final gauge wheel tire assembly 202a, 202b. Example of such families include: Thermoplastic Rubber (TPR), Thermoplastic Elastomer (TPE), Thermoplastic Vulcanizates (TPV), Polyamide, Polyethylene, Polypropylene, Polyoxymethylene, or Polychloroprene. Additives may be added to any of these elastomeric material families in order to tailor select properties to meet the requirements of the application.

The individual pieces of the final gauge wheel tire assembly 202a, 202b may be manufactured in a variety of ways. Examples of suitable manufacturing methods include casting, injection molding, transfer molding, compression molding, machining from billets, or additive manufacturing.

There are many different methods that may be utilized for combining the individual pieces of the final assembly of the novel gauge wheel tire design described herein. One way the individual pieces may be combined into a final assembly is through the use of an adhesive. Commercially available epoxy resins, such as Epon 828, available from Hexion Company of Columbus, Ohio, when cross-linked with appropriate curatives such as Versamid 140, available from BASF, headquartered in Ludwigshafen, Germany, can form a robust joint between the individual pieces of the final assembly. Joining surfaces 408, 808 (shown best in FIGS. 4B and 8B) should preferably be prepared prior to assembly with such an adhesive to remove any impurities or lubricants that might reduce the adherence between the adhesive and the joining surfaces 408, 808.

Another suitable method for combining the individual pieces into a final assembly involves the use of mechanical fasteners. The joining surfaces 408, 808 and surrounding areas of the individual components may, for example, be altered such that commercially available mechanical fasteners can be used to hold the mating surfaces of the final assembly against one another securely.

Yet another suitable method for combining the individual pieces into the final assembly involves the use of thermal welding. Thermoplastic materials may be heated to a melting point, such that they will become a viscous liquid. When the heat source is removed, the thermoplastic materials will cool and phase change back into solids. If two adjacent surfaces are heated, such that both phase change to viscous liquids and the melted material from the two surfaces is combined, when the heat source is removed the two surfaces will become one. In some implementations, friction may be used as the heat source to cause such melting. An individual component of the final gauge wheel tire assembly may be held against another individual component of the final gauge wheel tire assembly. By moving the two individual components relative to one another, either by simultaneously moving both components or by holding one component stationary while moving the other, friction between the mating surfaces will result in the generation of heat. The heat generated by the friction may be made high enough to cause the joining surfaces 408, 808 of the individual gauge wheel components to melt and combine. When the relative movement is stopped, friction is no longer generated, thus allowing the parts to cool and become one integral component. In some embodiments, the outer component 302, 702 may be spun relative to the inner component 304, 704, or vice versa, so as to cause such thermal welding to occur.

It should be appreciated that use of any of the above-described joining techniques may result in at least one seam being formed between the respective components at the joining surfaces 408, 808. Such seam(s) may, for example, comprise an adhesive material, a physical contact region between the joining surfaces, a thermal welding joint, etc.

In some embodiments, the hollow cavity 412, 812 (see FIGS. 4 and 8) may be filled with a spring-like material or multiple spring-like materials such as open or closed cell foam of various flexible materials, gas-filled rubber tubing, plastic springs, metallic springs or solid elastomeric tubing to adjust the flexibility of the gauge wheel as desired.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for making a gauge wheel tire, comprising:
   forming a first elastomer component;
   forming a second elastomer component; and
   moving the first elastomer component relative to the second elastomer component to generate friction that melts contacting portions of the first elastomer component and the second elastomer component so as to combine the first elastomer component and the second elastomer component into an assembly in which an axial support portion is spaced apart from a ground-engaging portion to form a gap that allows radial movement of the ground-engaging portion relative to the axial support portion.

2. The method of claim 1, wherein moving the first elastomer component relative to the second elastomer component comprises rotating the first elastomer component relative to the second elastomer component.

3. The method of claim 1, wherein forming the first elastomer component comprises curing a first quantity of polyurethane material in a shape of the first elastomer component.

4. The method of claim 3, wherein forming the second elastomer component comprises curing a second quantity of polyurethane material in a shape of the second elastomer component.

5. The method of claim 1, wherein forming the first elastomer component comprises forming the first elastomer component to include a first sidewall portion and a second sidewall portion spaced apart from the first sidewall portion.

6. The method of claim 5, wherein forming the first elastomer component further comprises forming the first elastomer component to include the ground-engaging portion connected between the first sidewall portion and the second sidewall portion.

7. The method of claim 1, wherein, when the first elastomer component is combined with the second elastomer component, the assembly forms an annular cavity between the first elastomer component and the second elastomer component.

8. The method of claim 7, wherein forming the first elastomer component comprises forming the first elastomer component to include at least one protrusion configured and arranged so that, when the first elastomer component is combined with the second elastomer component, the at least one protrusion is positioned within the annular cavity to inhibit radial movement of the ground-engaging portion relative the axial support portion.

9. The method of claim 1, wherein forming the first elastomer component comprises forming the first elastomer component to include at least one protrusion configured and arranged so that, when the first elastomer component is combined with the second elastomer component, the at least one protrusion is positioned to inhibit radial movement of the ground-engaging portion relative the axial support portion.

10. The method of claim 1, wherein:
    the first elastomer component has a first circular shape;
    the second elastomer component has a second circular shape; and
    the contacting portions of the first elastomer component and the second elastomer component include the first circular shape and the second circular shape.

11. The method of claim 10, wherein:
    the first circular shape corresponds to an inner circumference of the first elastomer component; and
    the second circular shape corresponds to an outer circumference of the second elastomer component.

12. The method of claim 1, wherein forming the first elastomer component further comprises forming the first elastomer component to include a protrusion extending axially from a first sidewall portion of the assembly, the protrusion including a generally flat region adapted to contact and clean debris from a disc or knife of an agricultural planter.

13. A gauge wheel tire, comprising:

a first elastomer component; and a second elastomer component connected to the first elastomer component to form an assembly that includes at least (A) a ground-engaging portion adapted to contact a ground surface as the gauge wheel tire rotates about an axis of rotation, and (B) an axial support portion spaced apart from the ground-engaging portion to form a gap that allows radial movement of the ground-engaging portion relative to the axial support portion, wherein:

the axial support portion comprises at least one protrusion that extends radially upward into the gap to inhibit the ground-engaging portion from moving radially inward beyond a height of the at least one protrusion; and there is a first seam at a first location where the first elastomer component and the second elastomer component are welded or glued together.

14. The gauge wheel tire of claim 13, wherein there is a second seam, separate from the first seam, at a second location where the first elastomer component and the second elastomer component are welded or glued together.

15. The gauge wheel tire of claim 14, wherein the first seam comprises a first thermal welding joint and the second seam comprises a second thermal welding joint.

16. The gauge wheel tire of claim 13, wherein:

the assembly further includes a first sidewall portion, and a second sidewall portion spaced apart from the first sidewall portion;

the ground-engaging portion extends between the first sidewall portion and the second sidewall portion; and the axial support portion extends between the first sidewall portion and the second sidewall portion.

17. The gauge wheel tire of claim 16, wherein the axial support portion extends about an inner circumference of the gauge wheel tire to form an annular cavity defined by the first sidewall portion, the second sidewall portion, the ground-engaging portion, and the axial support portion.

18. The gauge wheel tire of claim 16, wherein the assembly further comprises a protrusion portion extending axially from the first sidewall portion, the protrusion portion including a generally flat region adapted to contact and clean debris from a disc or knife of an agricultural planter.

19. The gauge wheel tire of claim 13, wherein the axial support portion has a different elastic modulus than the ground-engaging portion.

20. The gauge wheel tire of claim 13, wherein the axial support portion has a different hardness than the axial support portion.

21. The gauge wheel tire of claim 13, wherein the first seam comprises an adhesive material.

22. The gauge wheel tire of claim 13, wherein the axial support portion includes at least one flange that defines an annular cavity adapted to receive a circular gauge wheel rim.

23. The gauge wheel tire of claim 13, wherein the first elastomer component comprises a first polyurethane component and the second elastomer component comprises a second polyurethane component.

* * * * *